United States Patent [19]

Schmidt

[11] Patent Number: 5,236,110

[45] Date of Patent: Aug. 17, 1993

[54] CYCLE RACK

[75] Inventor: Erik Schmidt, Herning, Denmark

[73] Assignee: Erik Schmidt Autotilbehor ApS, Herning, Denmark

[21] Appl. No.: 768,658

[22] Filed: Oct. 11, 1991

[30] Foreign Application Priority Data

Apr. 14, 1989 [DK] Denmark .............................. 1802/89

[51] Int. Cl.⁵ ................................................ B60R 9/00
[52] U.S. Cl. .......................... 224/42.045 R; 224/42.42; 224/42.03 B; 269/99; 248/231.5
[58] Field of Search .................. 224/42.03 R, 42.03 B, 224/42.07, 314, 319, 322, 324, 327, 42.42, 42.43, 42.44, 42.45; 269/95, 96, 97, 98, 99, 100, 101, 102; 248/434, 231.5, 227; 211/5, 8, 17, 18, 21, 22, 104, 145, 198

[56] References Cited

U.S. PATENT DOCUMENTS

| 3,858,775 | 1/1975 | Haas | 224/42.03 B |
| 4,753,376 | 6/1988 | Tulio | 224/42.03 R |
| 5,000,363 | 3/1991 | Linquist | 224/42.07 X |
| 5,092,503 | 3/1992 | Cocks | 224/42.07 X |

FOREIGN PATENT DOCUMENTS

| 3900569 | 7/1990 | Fed. Rep. of Germany | 224/42.03 B |
| 2623760 | 6/1989 | France | 224/42.03 B |
| 2175859 | 12/1986 | United Kingdom | 224/42.03 R |

Primary Examiner—Henry J. Recla
Assistant Examiner—Glenn T. Barrett
Attorney, Agent, or Firm—Antonelli, Terry, Stout & Kraus

[57] ABSTRACT

A holding arrangement includes a pair of elongated branch members forming, for example, a support for a cycle rack, with a pair of links being arranged in a vicinity of lower ends of the branch members for connecting the branch members so as to enable a relative displacement between the branch members. An arrangement is disposed between the lower end portion and the upper end portion of the branch members for displacing the branch members from a closed position to an opened position and for applying a tensioning force to the branch member so as to lock the branch members to an object. The lower end of each branch member is provided with an arrangement for enabling a securing of the branch members to the object upon a displacement of the branch members to the opened position. A holding arrangement is provided on the object for firmly holding the branch members on the object with the holding arrangement including a pair of spaced abutments mounted on the object and defining a receptacle for receiving the lower ends of the branch members in the closed position. The lower ends of the branch members are respectively brought into a abutting relationship with portions of the spaced abutments when the branch members are displaced to the opened position so as to firmly anchor the branch members to the object by the tensioning force applied to the branch members.

15 Claims, 4 Drawing Sheets

CYCLE RACK

FIELD OF THE INVENTION

The present invention relates to a holding arrangement for mutual holding of two objects together, such as an object of a two-branch shape to another object, two mutually connected link means respectively connected with intermediate link means connecting the branches, and with the branches carrying a branch or jaw means shaped to grip a means as a holding means for the other object, and also with lockable toggle joint or blocking link means influencing, through the branches of the first object with tension to provide a holding force for the holding of the branches in position upon the holding means provided on the other object.

BACKGROUND OF THE INVENTION

A number of cycle racks have been proposed which are adapted to be removably mounted on a trailer ball hitch mounted on a rear of a vehicle, with bicycle-carrying means being mounted on the branches of the cycle rack, and with carrying means including two or more carriers disposed in a spaced relationship and extending substantially in a horizontal direction.

One disadvantage of conventional cycle racks resides in the fact that if the vehicle is used with a trailer or a camper attached to the ball hitch, a simultaneous transporting of bicycles is not possible unless, of course, the bicycles are transported in the trailer or in some other fashion mounted the trailer or camper. This solution is not good, mainly because it is difficult to maneuver bicycles in and out a narrow trailer or camper door. Moreover, a bicycle is somewhat lengthy object and is often difficult to "edge" in and out through such a door. A solution could be to mount a ball hitch on a top of a trailing rod or triangular tongue of a trailer or camper; however, a ball hitch is not an inexpensive item to manufacture.

SUMMARY OF THE INVENTION

The aim underlying the present invention essentially resides in providing a holding means adapted to function together with a holding mechanism of the type described above which, in a closed or tensioned condition, securely mounts the cycle rack to a vehicle.

In accordance with the present invention, the holding means is fashioned of a ribbon, U-shaped or V-shaped profile, with the holding mechanism being lockable so as to prevent theft of the cycle rack and with the other holding means being easily attachable to, for example, the towing rod or trailing triangular tongue of a camper or trailer.

In accordance with further features of the present invention, preferably, supporting means are provided on a cycle rack whereby it is possible to carry long objects such as, for example, skis or similar equipment in a more upright position together with or instead of bicycles.

According to the present invention, a link means at the branches forms a joint with play with respect to the branches with the holding means being shaped as two elements disposed on respective branches. In a holding position, lower end of the branches abut against to abutment means, with the abutment by the branches against the abutment means taking place at least at two different distances from locations of the link connections of the branches. The play in the link joint is such that the play is not cancelled by the application of a tensioning force.

To achieve a mutual holding of two objects to each other, the abutment means of the present invention are sufficiently strong and rigidly connected to each other. For this purpose, a sufficiently rigid and bent flat iron may be bent into a U-shape, which U-shape easily lends itself to a fastening, by conventional means to, for example, an upper side of a trailing rod or trailing triangular tongue of a camper or trailer.

According to the present invention, the holding means comprises two U-shaped means opening in a direction toward each other, the openings of the respective U-shaped means may preferably have a size corresponding to peripheral shapes or contours of the cycle rack, whereby the branches can be inserted into a space defined by the U-shaped means and, through tensioning by the holding mechanism, the branches are pressed to abut with a maximum force against the internal sides of the U-shaped means at a location of the abutment and/or locations of the abutments of the branches located nearest the location at which the link connection is provided between the branches due to the play of the link joint.

According to the present invention, the holding means may include a basket-shaped member and the basket-shaped member may extend to one or the other side with respect to an area occupied by the holding mechanism. The basket-shaped member may be provided with a suitably strong bottom portion adapted to support lengthy objects or items in an upright position, with such objects or items being, for example, skis or other lengthy equipment which, by, for example, a suitable resilient binding means are fastened to the carrying means on the cycle rack. Such a basket-shaped member may also form a part of the holding mechanism. For this purpose, an advantageous selecting of material of which the basket-shaped member is fashioned may dictate additional elasticity of the holding mechanism and may increase the adaptability to the holding means such as, when the holding means is shaped as ball hitch. According to the invention, this may be attained with the link connection means or one of the link connection means between the branches is basket-shaped and, in particular, has an opened basket-shape.

An increase holding force and simultaneously a safety means against theft may, according to the present invention, be attained by virtue of the provision of a locking means for preventing an edging out of the mechanism from the other holding means, with the locking means being removably mounted and disposed at the location or locations of abutment spaced from the location of link connection for the branches.

BRIEF DESCRIPTION OF THE DRAWINGS

The above and other objects, features and advantages of the present invention become more apparent from a description of the several embodiments described in more detail hereinbelow in connection with the accompanying drawings, wherein.

DETAILED DESCRIPTION

Figure 1:
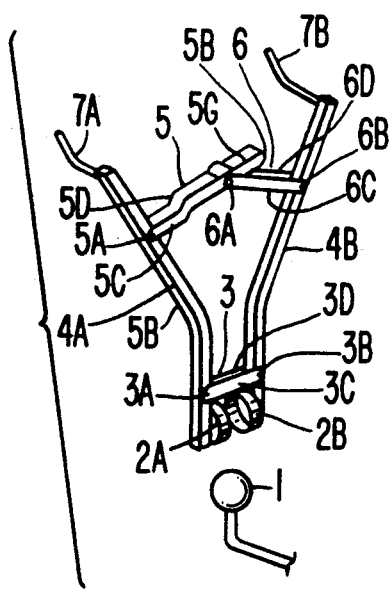
FIG. 1 is an exploded perspective view of a prior art cycle rack adapted to be mounted behind a vehicle on a conventional ball hitch.

As shown in FIG. 1, a cycle rack includes carrying branches 4A, 4B adapted to be mounted on a ball hitch 1 located at a rear of a vehicle (not shown) with the ball hitch 1 being of the type used for towing a trailer, camper or other vans for carrying goods, equipment, etc.

A cycle rack of the type illustrated in FIG. 1 is disclosed in, for example, U.S. Pat. No. 5,121,862, and further comprises two annular grip or jaw means 2A, 2B adapted to grip opposite sides of the ball hitch 1. The grip or jaw means 2A, 2B are respectively located on the two opposite upwardly extending branches 4A, 4B which, by link bolts 3A, 3B and two intermediary connecting means, for example, fishplates 3C, 3D, are connected with each other at a position above the grip or jaw means 2A, 2B. By link bolts 5A, 5B, the branches 4A, 4B are connected by a toggle joint or tensioning means 5, 6 including, for example, double branches 5C, 5D and 6C, 6D and a mid link bolt 6A as well as a pawl or abutment means 5B capable of applying a tensioning force to maintain the branches 4A, 4B spread apart so that the grip or jaw means 2A, 2B squeeze or grip the ball hitch 1. A gripping arm 5G or the like associated with the toggle joint or tensioning means 5, 6 facilitates mounting of the cycle rack and a locking means (not shown) may be provided to lock the tension toggle joint 5, 6 so as to prevent removal of the cycle rack from the ball hitch 1. Two carrying means or branches 7A, 7B are respectively provided at the upper edges of the branches 4A, 4B with the branches 7A, 7B being adapted to carry one or more bicycles.

Although the toggle joint or tensioning means 5, 6 plays an important role in mounting the cycle rack to the ball hitch 1, the direct operational elements of the holding mechanism of the cycle rack are the elements located at the lower ends of the branches 4A, 4B, which elements are illustrated in upper portions of FIGS. 2 and 7, and will be discussed more fully hereinbelow.

Figure 3:
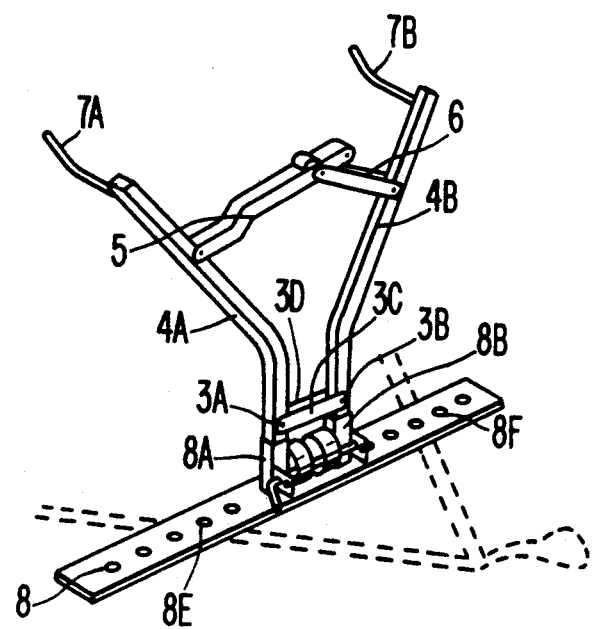
FIG. 3 is a perspective view of the holding mechanism of FIG. 2 used with the cycle rack of FIG. 1.

Rather than using a ball hitch 1, according to the present invention, another type of holding means constructed in accordance with the present invention, may be provided. More particularly, as shown in FIGS. 2 and 3, a holding means 8 may be fashioned as a cross rail or a cross flat iron provided with two upwardly extending abutment means 8A, 8B positioned in such a manner that the abutments 8A, 8B function receive lower portions of the branches 4A, 4B, with the lower ends of the branches 4A, 4B fitting between the abutment means with a minimal play and with the abutment between the lower ends of the branches 4A, 4B taking place against external sides of the abutment means 8A, 8B. Any play or backlash, preferably should be minimal at the lower ends of the branches 4A, 4B. The branches 4A, 4B are inserted between the abutment means while the toggle joint or tensioning means 5, 6 or any other embodiment of a branch spreading mechanism is in an opened, that is, a non-tensioned condition, whereby the force or tension at the abutment means 8A, 8B increases at the ends of the abutment means 8A, 8B located nearest to the location of the connection of the branches 4A, 4B by the link bolts 3A, 3B, such that the location of the abutment at the lower end of the branches 4A, 4B operates as a center of movement of the rotation of the toggle joint or tensioning means 5, 6 or any other branch spreading mechanism. Once the toggle joint or tensioning mechanism 5, 6 becomes activated, through tensioning, the branches 4A, 4B are spread from each other in the area over the location of the connection at the link bolts 3A, 3B, for example, at the bolts 5A, 6B. For this purpose, it is necessary that the connection, for example, at the link bolts 3A, 3B provides a play or possible play movement which is not nullified while spreading the branches 4A, 4B above the location of the connections formed by the link bolts 3A, 3B. On the other hand, the play or possible play movements at the link bolts 3A, 3B is nullified when tensioning of the branches 4A, 4B takes place to provide fastening of the holding mechanism which may also grip the ball hitch 1.

Figure 2:
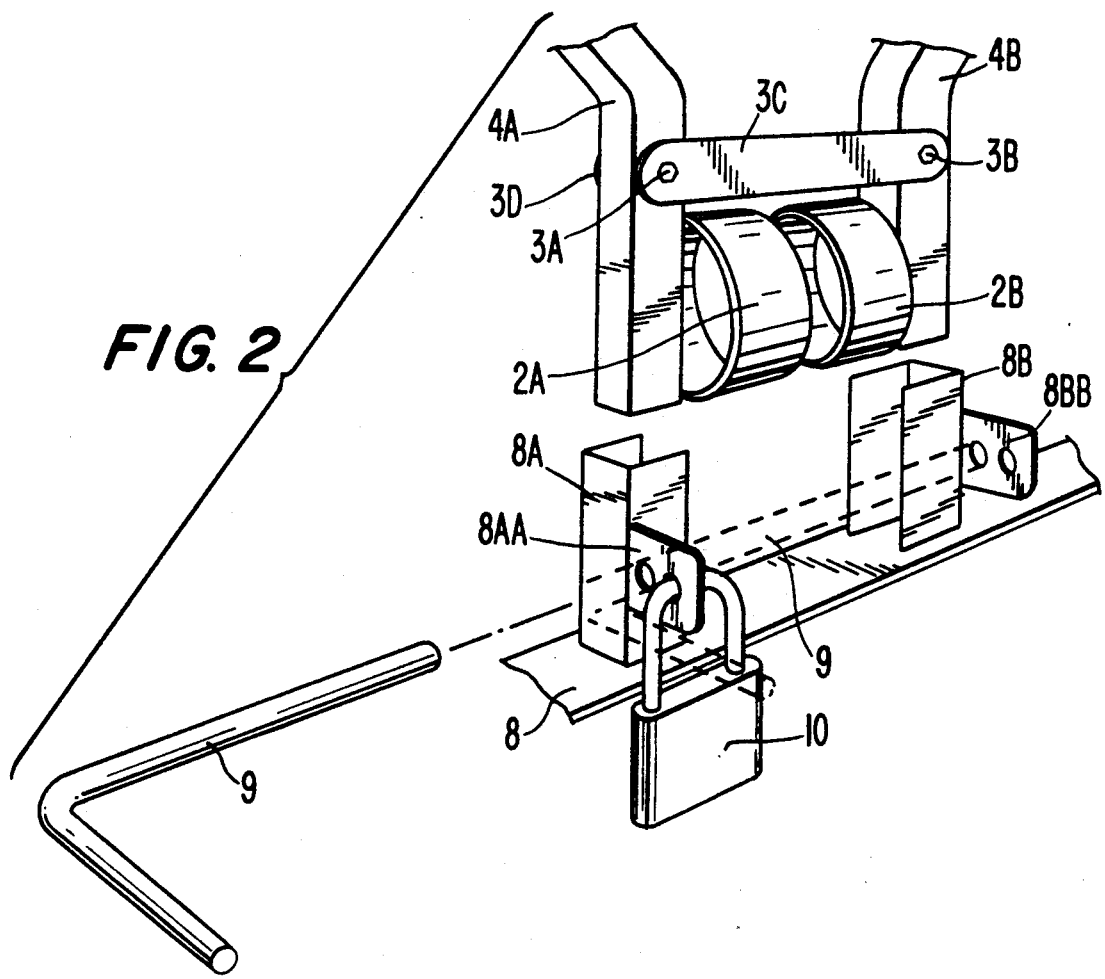
FIG. 2 is a perspective exploded view, on an enlarged scale, of an embodiment according to the invention.

The abutment means 8A, 8B may, for example, be provided with eye means 8AA, 8BB for accommodating a locking rod, with the rod passing through, for example, the annular shaped grip or jaw means 2A, 2B, to assume the position illustrated in phantom line in FIG. 2, so that the branches 4A, 4B, the holding mechanism and the entire cycle rack cannot be removed from the abutment means 8A, 8B. The more stable the lower ends of the branches 4A, 4B are maintained in place in a tensioned condition, the more secure the holding mechanism is fastened to the holding means 8. By, for example, a suitable locking means such as a padlock 10 or the like in cooperation with the angled portion of the locking rod 9, the holding mechanism provides a safeguard against theft and also insures better positioning of the cycle rack. Furthermore, an additional support is provided by virtue of the U-shape of the abutment means 8A, 8B.

The holding mechanism according to the present invention may be generally regarded as a means for holding two objects together, namely, the cycle rack and the grip or jaw means on the ball hitch 1, or the cycle rack and the holding means.

The holding means 8, as shown in FIG. 3, may be provided with rows of holes 8E, 8F through which bolts (not shown) for fishplates or the like may be inserted so that a tensioned fashioning to the trailing triangular tow hitch or tongue of the camper can be achieved as shown in phantom lines in FIG. 3.

As can be appreciated, the cycle rack may be mounted with the carrying means 7A, 7B extending rearwards or extending forwards so that the best positioning may be a matter of choice.

Figure 5:
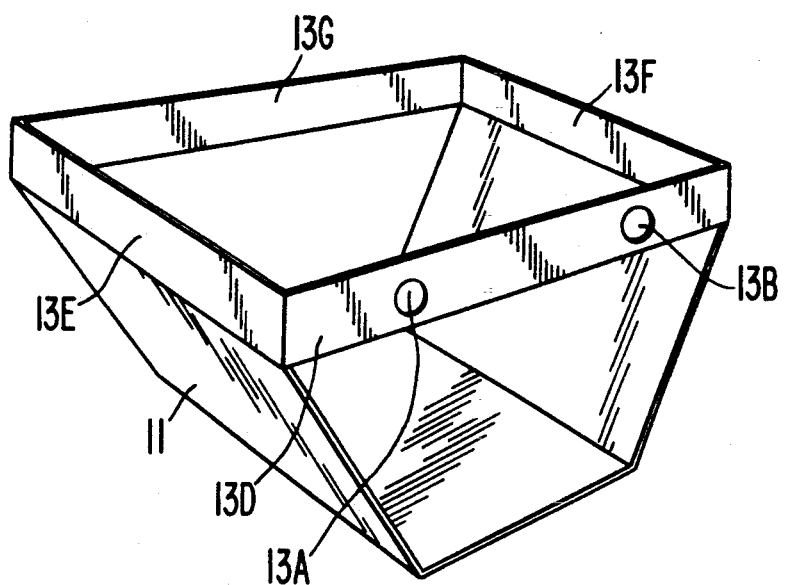
FIG. 5 is a perspective view of another embodiment of a supporting basket constructed in accordance with the present invention.
Figure 4:
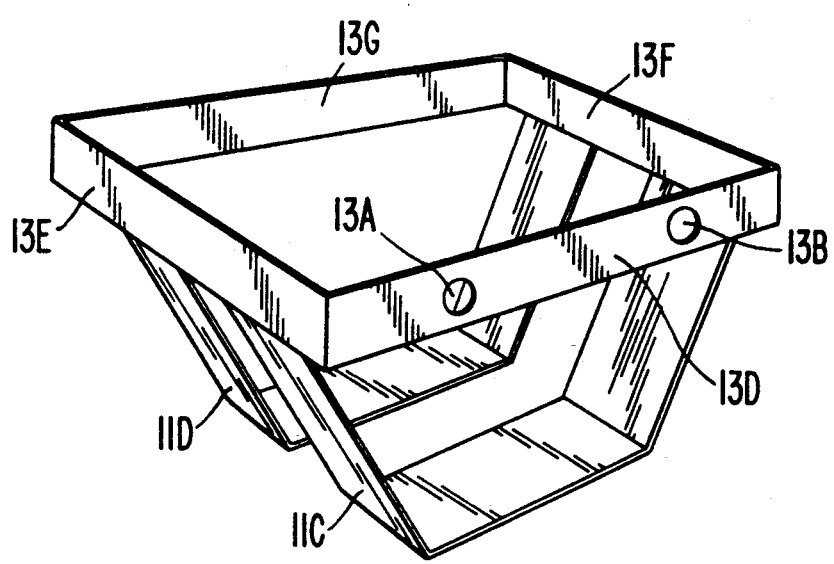
FIG. 4 is a perspective view of a supporting basket for accommodating lengthy items or objects to be transported when using a cycle rack according to FIGS. 1 and 2.

As shown in FIG. 4, a basket is provided which includes a basket bottom of two boom irons 11C, 11D; however, it is also possible as shown in FIG. 5 for the basket to be fashioned in such a manner that the basket is provided with a one piece basket bottom 11. The basket may, for example, comprise edge sections 13D, 13E, 13F, 13G, of which the edge section 13D is provided with two openings or holes 13A, 13B adapted to receive the link bolts 3A, 3B. It is also possible for the basket of FIG. 4 or FIG. 5 to be mounted instead of or together with or be arranged in parallel with the link connection fishplate 13D. Thus, the basket of FIG. 4 or FIG. 5 supports an operational function of the fishplate 13D.

The basket may, together with one or more spacing elements (not shown) possibly be mounted between the openings or holes 13A, 13B so that the fishplate 3C of FIGS. 2 and 3 may be located on the basket, whereby the placing of the basket, in practice, is facilitated.

Figure 6:
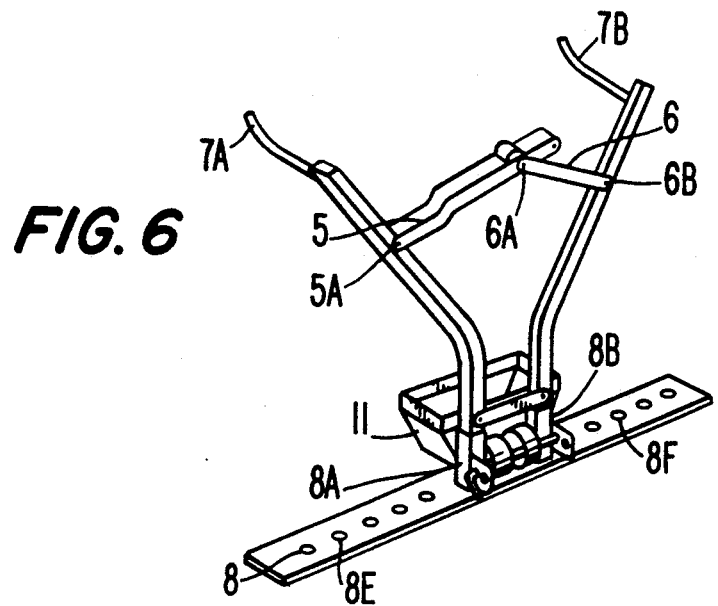
FIG. 6 is a perspective view of the supporting basket of the FIG. 5 mounted on the holding mechanism of FIG. 3.
Figure 7:
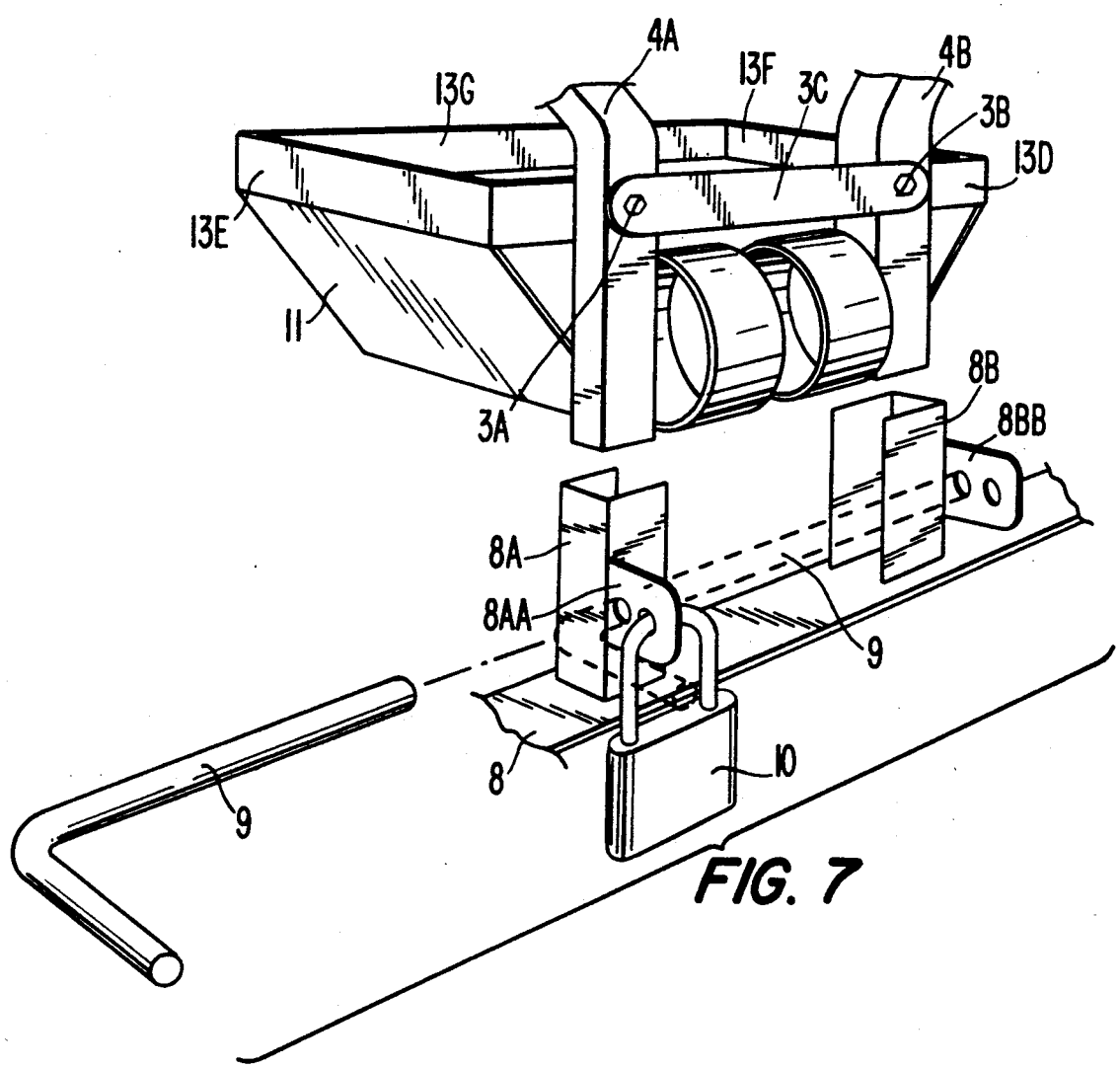
FIG. 7 is a perspective exploded view of the holding mechanism of FIG. 2 provided with the supporting basket to FIG. 5.

FIGS. 6 and 7 provide an example of the basket of FIG. 5 mounted with the holding mechanism of FIGS. 2 and 3.

With the basket of FIG. 5, it is only possible to position the cycle rack as shown in FIG. 6. However, with the basket of FIG. 4, it is also possible to position the cycle rack in a mounted position so that the carrying means 7A, 7B may face forwardly or rearwardly, since the mounting or positioning of the locking rod 9 is not affected by the basket portion 11.

Figure 9:
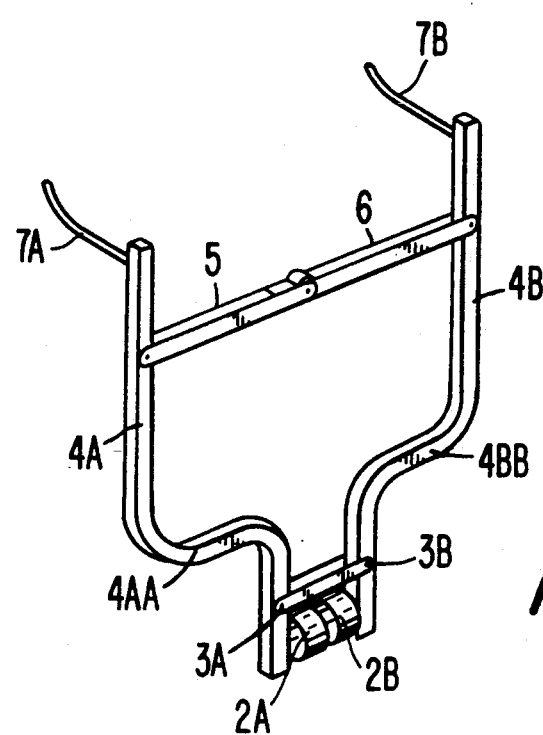
FIGS. 8 and 9 are perspective views of further embodiments constructed in accordance with the present invention.
Figure 8:
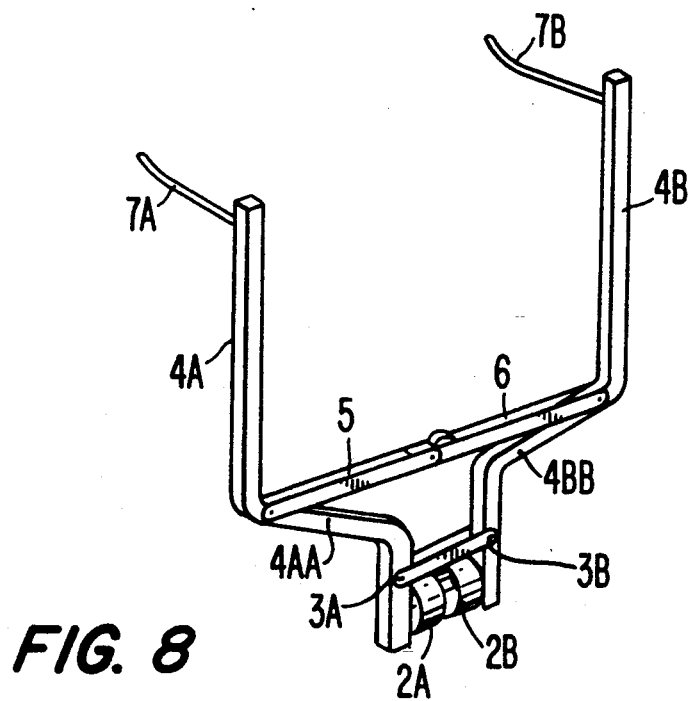

The embodiments of FIGS. 8 and 9 provide a more secure arrangement of twisting of the rigid holding of the branches 4A, 4B in that the holding means 8A, 8B as well as the branches 4A, 4B, preferably, at a distance shortly above or in a vicinity of the connection 3A, 3B are fashioned so as to be outwardly curved to form branch portions 4AA, 4BB. At the outer portions of the branch portions 4AA, 4BB, the locking toggle joint or tensioning means 5, 6 is connected to the branches 4A, 4B. In this embodiment, it is necessary that the locking toggle joint or tensioning means 5, 6 be manufactured so as to be more rigid, since, to achieve the same tensioning force at the abutment means 8A, 8B, the force influence on the toggle joint or tensioning means 5, 6, must be greater since the distance between the toggle joint or tensioning means 5, 6 and the location of the link bolts 3A, 3B, measured in the vertical direction, is less than the vertical direction in the previously described embodiments. For this reason, the embodiment of FIG. 9 may, for many purposes, be considered as the better of the embodiments of FIGS. 8 and 9. Through the embodiments of FIGS. 8 and 9, it is achieved that, at the branches 4A, 4B at the branch portions between the link bolts 3A, 3B and the abutment means 8A, 8B, there is a lesser tendency to a twisting movement about the longitudinal axis. Simultaneously, a more secure fastening of the complete carrying device is attained, since the branch portions 4AA, 4BB are located nearer to, for example, the bumper of a vehicle upon which the carrying device is mounted, so that any twisting motion around a vertical axis passing through the abutment means 8A, 8B are considerably reduced. Additionally, a middle rear area of the vehicle is less covered by the cycle rack or carrying device than the previously described embodiments, which is advantageous in that the middle area of the vehicle is the area where a license place is mounted. When using the embodiments of FIGS. 8 and 9, it is also easier to position a bicycle on the mounted cycle rack, because the pedals of the bicycle more easily slide in between the branches 4A, 4B which define a larger free area.

I claim:

1. A holding arrangement, comprising:
a pair of elongated branch members each having an upper end and a lower end;
a pair of link means arranged in a vicinity of said lower ends of said branch members for connecting said branch members in such a manner so as to enable a relative displacement between the branch members;
means disposed between said lower end and said upper end of each of said branch members for displacing said branch members from a closed position to an opened position and for applying a tensioning force to said branch members so as to lock the lower ends of the branch members to an object;
means provided on the lower end of each of said branch members for securing the branch members to the object upon a displacement of the branch members to the opened position; and
holding means provided on said object for firmly holding the branch members on said object, and
wherein at least one of the link means forms a joint with one of the branches whereby said joint permits a predetermined play between the link means and the branch, and
wherein said holding means includes a pair of spaced abutment means mounted on said object and defining a receptacle for receiving the lower ends of said branch members when said branch members are in said opened position, said lower ends of said branch members being respectively brought into an abutting relationship with portions of the spaced abutment means in the opened position so as to firmly anchor the branch members to the object by the tensioning force applied to said branch members by said means for displacing and applying the tensioning force.

2. A holding arrangement according to claim 1, wherein said holding means comprises a pair of spaced U-shaped members opening in a direction facing each other so as to define a receptacle receiving the lower ends of said branches.

3. A holding arrangement according to claim 2, wherein said U-shaped members are at least partially closed to improve rigidity of the holding means.

4. A holding arrangement according one of to claims 1, 2 or 3, wherein a further holding means is provided including a basket-shaped member disposed so as to extend to one side of an area occupied by the holding arrangement.

5. A holding arrangement according to claim 4, wherein the basket-shaped member includes a portion forming one of said pair of link means.

6. A holding arrangement according to claim 5, further comprising a removable locking means for preventing removal of the branch members from the abutment means.

7. A holding arrangement according to claim 6, wherein the branches include outwardly curved bending branch portions to prevent twisting of the branch members in the closed position relative to said abutment means.

8. A holding arrangement according to claim 7, wherein said means for displacing includes a toggle joint disposed at a location spaced from and end the outwardly curved bending branch portions.

9. A holding arrangement according to claim 1, wherein a further locking means is provided and is cooperable with said means formed on the lower ends of each of said branch members for enabling a securing of the branch members, with said further locking means preventing removal of the branch members from the abutment means.

10. A holding arrangement according to claim 9, wherein said further locking means includes an angle pin member extending through openings provided in a portion of the respective abutment means.

11. A holding arrangement according to claim 1, wherein a further holding means is provided including a basket-shaped member having a portion thereof forming one of said pair of link means.

12. A holding arrangement according to claim 1, wherein said means for displacing and applying a tensioning force includes a toggle joint positioned above the pair of link means.

13. A holding arrangement according to claim 12, wherein each of the branch members include an outwardly bent branch portion, said outwardly bent branch portion terminating in a further branch portion extending substantially in parallel with a lower end portion of the branch member, and wherein the toggle joint is arranged in an area wherein the outwardly bent branch portion merges with the further branch portion.

14. A holding arrangement according to claim 12, wherein each of the branch members includes an outwardly bent branch portion, said outwardly bent branch portions terminating in a further branch portion extending substantially in parallel with a low end portion of the branch member, and wherein the toggle joint is arranged in the further branch portion at a position spaced from the bent branch portion.

15. A holding arrangement according to claim 1, wherein the branch members form a support for a cycle carrier, and wherein a cycle carrier member is provided at the upper end of each of said branch members.

* * * * *